(12) United States Patent
Maker, III

(10) Patent No.: US 9,894,400 B2
(45) Date of Patent: Feb. 13, 2018

(54) PROFILE DRIVEN COMMUNICATION POLLING FOR REMOTE CONTROL

(71) Applicant: Roku, Inc., Saratoga, CA (US)

(72) Inventor: Frank Llewellyn Maker, III, Livermore, CA (US)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 14/710,226

(22) Filed: May 12, 2015

(65) Prior Publication Data

US 2016/0337686 A1    Nov. 17, 2016

(51) Int. Cl.
| | |
|---|---|
| *H04H 60/33* | (2008.01) |
| *H04H 60/32* | (2008.01) |
| *H04N 21/422* | (2011.01) |
| *H04N 21/442* | (2011.01) |
| *H04N 21/466* | (2011.01) |
| *H04N 5/44* | (2011.01) |
| *G08C 17/02* | (2006.01) |
| *H04N 5/63* | (2006.01) |

(52) U.S. Cl.
CPC ....... *H04N 21/42206* (2013.01); *G08C 17/02* (2013.01); *H04N 5/4403* (2013.01); *H04N 21/4424* (2013.01); *H04N 21/44204* (2013.01); *H04N 21/4667* (2013.01); *G08C 2201/12* (2013.01); *G08C 2201/50* (2013.01); *H04N 5/63* (2013.01); *H04N 2005/4444* (2013.01)

(58) Field of Classification Search
CPC .............. H04N 21/251; H04N 21/262; H04N 21/42204; H04N 21/42207; H04N 21/44218; H04N 21/4663
USPC ...................................... 725/9, 16
See application file for complete search history.

(56) References Cited

U.S. PATENT DOCUMENTS

| | | | |
|---|---|---|---|
| 6,807,159 B1 | 10/2004 | Shorey et al. | |
| 9,319,993 B1* | 4/2016 | Urbanus | H04W 52/22 |
| 2007/0300265 A1* | 12/2007 | Karkkainen | H04H 60/25 |
| | | | 725/62 |
| 2013/0067261 A1 | 3/2013 | Carroll | |
| 2013/0290526 A1 | 10/2013 | Navada et al. | |

(Continued)

FOREIGN PATENT DOCUMENTS

WO    WO-2010/094320 A1    8/2010

OTHER PUBLICATIONS

International Search Report and Written Opinion of the International Searching Authority dated Aug. 8, 2016 in International Application No. PCT/US2016/031739.

(Continued)

*Primary Examiner* — Kyu Chae
(74) *Attorney, Agent, or Firm* — Sterne, Kessler, Goldstein & Fox P.L.L.C.

(57) ABSTRACT

System, method and computer program product for determining a polling schedule for a remote control, are described. A multimedia device collects usage data that identifies when the multimedia device is in use. The probability that the multimedia device is in use for a particular time is determined based on the usage data. A polling schedule is generated based on the usage probability such that the periods in the polling schedule vary according to the usage probability to minimize energy consumption. The polling schedule is then transmitted to the remote control where the remote control polls the multimedia device according to the polling schedule.

20 Claims, 8 Drawing Sheets

(56) References Cited

U.S. PATENT DOCUMENTS

| | | | | |
|---|---|---|---|---|
| 2013/0326250 A1* | 12/2013 | Sullivan | ................ | G06F 1/3206 |
| | | | | 713/323 |
| 2014/0009689 A1* | 1/2014 | Hayes | ................... | G06F 1/1626 |
| | | | | 348/734 |
| 2014/0222169 A1 | 8/2014 | Kazuno et al. | | |
| 2014/0267931 A1* | 9/2014 | Gilson | ................ | H04N 5/4403 |
| | | | | 348/734 |
| 2015/0012257 A1* | 1/2015 | Backholm | ............. | H04L 41/145 |
| | | | | 703/13 |
| 2015/0379126 A1* | 12/2015 | Livshits | ............ | G06F 17/30864 |
| | | | | 707/722 |

OTHER PUBLICATIONS

International Preliminary Report on Patentability and Written Opinion of the International Searching Authority for International Application No. PCT/US2016/031739, dated Nov. 23, 2017 (9 pages).

* cited by examiner

PROFILE DRIVEN COMMUNICATION POLLING FOR REMOTE CONTROL

FIELD

The field relates generally to a remote control device, and more specifically to conserving battery life of the remote control device.

BACKGROUND

A remote control controls functionality of a multimedia device. For example, a remote control may select streaming content that the multimedia device displays using a television set, or control functionality of the television set. Conventionally, a remote control uses a battery to control the multimedia device. Because the battery life is finite, there is a need to conserve battery life of the remote control.

BRIEF SUMMARY

System, method, and a computer program product embodiments, and combinations and sub-combinations thereof, for determining a polling schedule for a remote control, are disclosed. In an embodiment, a multimedia device collects usage data that identifies when the multimedia device is in use. The probability that the multimedia device is in use for a particular time is based on the usage data. A polling schedule is generated based on the usage probability such that the time periods between the polls vary according to the usage probability. The polling schedule is transmitted to the remote control. The remote control polls the multimedia device according to the received polling schedule.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for generating a polling schedule for polling a multimedia device.

Figure 1:
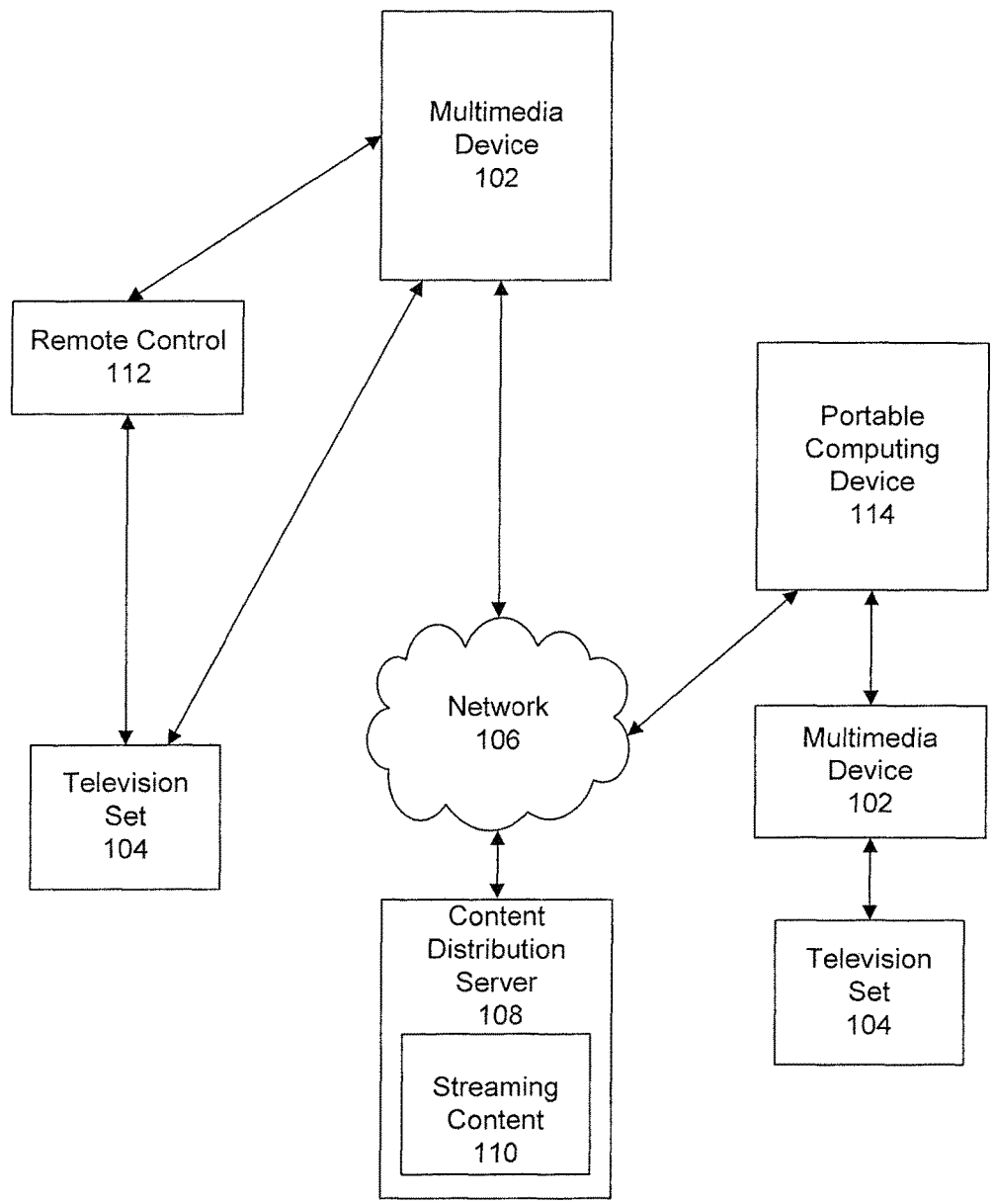
FIG. 1 is a block diagram of a system where example embodiments may be implemented.

FIG. 1 is a block diagram 100 of a system where example embodiments may be implemented.

In an embodiment, block diagram 100 includes a multimedia device 102. Multimedia device 102 may be a computing device that displays media or multimedia. Example multimedia may be data that is a combination of one or more of text, audio, still images, video, etc. In another example, multimedia device 102 may be a data streaming device that provides streaming content over a network for display on a television set 104 or another display device that has or is coupled to a display screen, such as a computer. Example streaming content includes multimedia content, such as, movies, television episodes, advertisements, commercials, news, streaming channels, video clips, video games, on-demand video content, and photos. Example streaming content also includes audio and Internet content, to name a few examples.

Example multimedia device 102 may be a streaming stick or a streaming player, or a device that is included as part of display or a multimedia rendering device that is included in, for example, a television set 104. In an embodiment, multimedia device 102 provides content, including multimedia and streaming content to television set 104 using, for example, High-Definition Multimedia Interface ("HDMI®"), composite cables, V-by-one HS cable, low-voltage differential signaling ("LVDS") cable or other connecting means. HDMI is a proprietary audio/video interface for transferring uncompressed video data and also for transferring compressed and/or uncompressed audio data between HDMI compliant devices.

In a further embodiment, multimedia device 102 includes communication interface that connects multimedia device 102 to other computing devices. Communication interface may include an Ethernet port, Universal Serial Bus ("USB") port and a memory card port, to name a few examples. In a further embodiment, multimedia device 102 may also display the content of other computing devices on television set 104. In a further embodiment, these multimedia devices 102 may be daisy-chained together, such as, when a digital video recorder ("DVR") is connected to a cable box.

In an embodiment, multimedia device 102 may be a portable device that may be transported to different locations and be connected to television set 104 or another device that displays streaming content at one of these different locations. In another embodiment, multimedia device 102 and television set 104 may be combined into a single device (not shown). In yet another embodiment, multimedia device 102 may also deliver content wirelessly, using, for example, a Wi-Fi.

In an embodiment, to obtain streaming content over a network, multimedia device 102 may utilize one or more networks, collectively referred to as network 106. In an embodiment, network 106 may be a wired and/or wireless network. Network 106 may also include interconnected computer networks, referred collectively as the Internet. In an embodiment, network 106 may include private, public, academic, business, and government networks that include extensive amounts of information and resources.

In an embodiment, the resources that are connected to network 106 include a content distribution server 108. Content distribution server 108 stores and distributes streaming content 110 over network 106. To store streaming content 110, content distribution system 108 may include a database storage or another non-volatile storage discussed, for example, in detail in FIG. 6. At the request of multimedia device 102, content distribution server 108 provides requested streaming content 110 to multimedia device 102 for streaming and eventual display on television set 104.

In an embodiment, a remote control 112 controls, manipulates and otherwise accesses multimedia device 102 and/or television set 104 (remote control 112 may also interact with other devices, such as receivers, digital video disc (DVD) players, amplifiers, etc.). For example, remote control 112 may include buttons for turning multimedia device 102 on and off, channel selection buttons, volume control buttons, channel shortcut buttons, and programmable "favorites" buttons that store a shortcut to favorite channels, movies, on-demand content, etc. In another example, remote control 112 can be used to navigate to movies, music, shows, etc., stored on content distribution server 108 that may be selected for viewing and displaying on television set 104 via multimedia device 102. In a further embodiment, remote control 112 includes a built-in headphone jack for private listening, as well as motion control and gaming buttons. In yet another embodiment, remote control 112 includes an audio interface that may be turned on and off based on a request from multimedia device 102 that, for example, may identify a location of remote control 112 or play audio alerts.

In a further embodiment, system 100 also includes a portable computing device 114. Portable computing devices 114 may include smartphones, tablets, media players, and other like devices. Portable computing device 114 may download and store applications, that, when executed on portable computing device 114, cause the portable computing device 114 to simulate functionality of remote control 112 as discussed in FIGS. 1-6.

Figure 6:
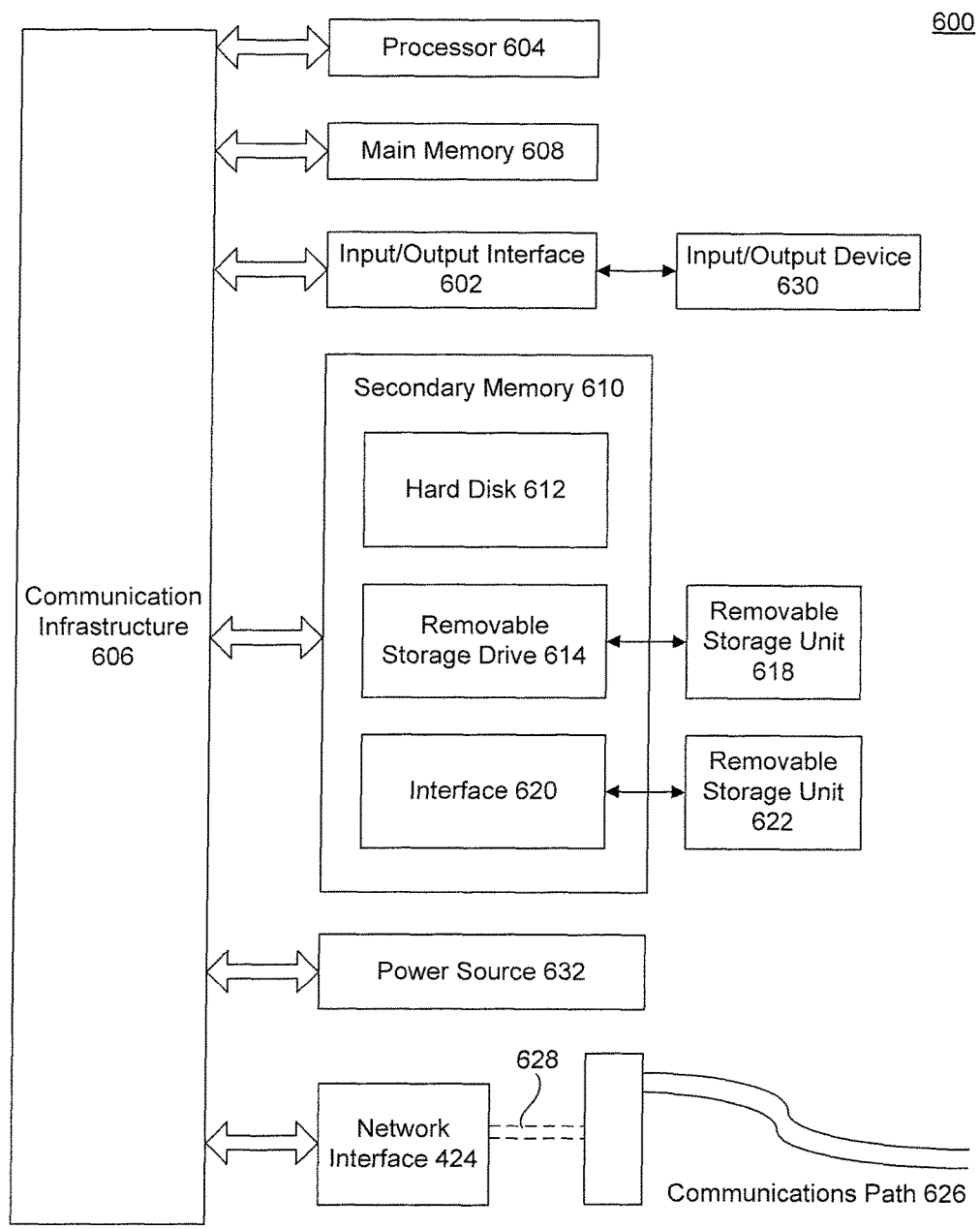
FIG. 6 is an exemplary computing device where the contemplated embodiments can be implemented.

In a further embodiment, remote control 112 may include hardware, including a memory, a processor and a communication interface, as well as combinations and/or sub-combinations thereof, that are described, for example, in detail in FIG. 6, and that enable remote control 112 to receive and process data with, and on behalf of, multimedia device 102. For example, multimedia device 102 may generate or receive messages, firmware updates, ringtone updates, etc., over network 106 that multimedia device 102 may communicate to remote control 112. For example, multimedia device 102 may send a message to remote control 112 that causes remote control 112 to play a ring tone. In another example, multimedia device 102 may receive new firmware or ringtones that may be downloaded and executed on remote control 112. In another example, multimedia device 102 may transmit a message, such as a news message, an alert message, or a message from another user who may be also using multimedia device 102 to remote control 112. Once remote control 112 receives the message, remote control 112 may perform functions associated or required by the received message. For example, remote control 112 may play the message using the audio hardware included or coupled to remote control 112, or execute the firmware upgrade. In another embodiment, remote control 112 may also receive and play a message from multimedia device 102 when multimedia device 102 completes pairing remote control 112 to multimedia device 102.

In an embodiment, to receive messages, firmware upgrades, etc., from multimedia device 102, remote control 112 is communicatively coupled to multimedia device 102 via a wired or wireless network. To maintain communication with multimedia device 102, as well as to process messages and firmware upgrades, remote control 112 requires a power source. An example power source is a rechargeable or non-rechargeable battery that is known to a person of ordinary skill in the art. A battery stores a finite amount of energy. When the energy is drained the battery must either be recharged or replaced. For example, the battery may be drained when remote control 112 and multimedia device 102 maintain a wired or wireless connection without exchanging data, such as, but not limited to messages, alerts, or firmware upgrades.

One way to conserve battery life on remote control 112 is for remote control 112 to intermittently communicate with multimedia device 102, rather than maintain a constant wired or wireless connection. In an embodiment, remote control 112 polls multimedia device 102 at predetermined time intervals. When remote control 112 polls multimedia device 102, remote control 112 alternates between a low power standby mode (or "sleep" mode) and a higher power mode (or "awake" mode). For example, remote control 112 remains in the sleep mode and periodically switches to an awake mode. During the awake mode, remote control 112 communicates with multimedia device 102 or television set 104, as well as receives and processes messages, firmware upgrades, etc., from multimedia device 102. Typically, remote control 112 polls multimedia device 102 at different fixed time intervals, for example every ten or fifteen seconds. In an embodiment, to further conserve battery life, the time interval when remote control 112 polls multimedia device 102 may vary based on the activity that occurs on multimedia device 102 or the battery level of remote control 112.

As discussed above, when remote control 112 polls multimedia device 102, remote control 112 switches between a sleep mode and an awake mode. In an embodiment, the polling mechanism controls the time periods when remote control 112 remains in a sleep mode before switching to an awake mode. In a further embodiment, these time periods may be adjusted based on when multimedia device 102 is being classified as being in an active mode or in an idle mode. When multimedia device 102 is in an active mode, remote control 112 may poll multimedia device 102 more frequently than when multimedia device 102 is in an idle mode.

In an embodiment, whether multimedia device 102 is in an active or idle mode may depend on predefined criteria. For example, the criteria may determine that multimedia device 102 is in active mode when multimedia device 102 is likely to receive communication from remote control 112, and in an idle mode when multimedia device 102 is unlikely to receive communication from remote control 112.

For example, multimedia device 102 may be in an active mode when multimedia device 102 streams streaming content 110, streams streaming content 110 of a particular type, streams streaming content 110 of a predetermined length, or streams streaming content 110 for less than a predetermined amount of time. For example, when multimedia device 102 streams content that include commercials, video clips, cartoons and sitcoms, or has streamed a movie for, for example, less than ten minutes, multimedia device 102 may be classified as being in the active mode because a user is likely to use remote control 112 during this time.

In another example, multimedia device 102 may be in an idle mode when not streaming content 110, or is streaming content 110 that is greater than a predefined length. For example, when multimedia device 102 is not streaming content 110 (or, in some embodiments, not continuously streaming content), multimedia device 102 might be classified as being in an idle mode since it is not being used; thus the user is unlikely to use the remote control 112. As another example, when multimedia device 102 streams movies and concerts for more than ten minutes, multimedia device 102 may be classified as being in an idle mode because a user is unlikely to use remote control 112 during extended viewing.

In another embodiment, multimedia device 102 may be classified as being in an active mode or an idle mode based on the time of day. For example, at night, when multimedia device 102 is not likely to be used, such as, for example, from 1:00 am to 4:00 am, multimedia device 102 may be classified as being in an idle mode. In another example, in the evening when multimedia device 102 is more likely to be used, for example from 7:00 pm to 11:00 pm, multimedia device 102 may be classified as being in an active mode.

As discussed above, the polling period during which remote control 112 polls multimedia device 102 may be a function of whether multimedia device 102 is predicted to be in an active mode or an idle mode. For example, when multimedia device 102 is predicted to be in an idle mode, the time period between polls on remote control 112 may be set to a longer time period than when multimedia device 102 is predicted to be in an active mode. As a result, over time remote control 112 will poll multimedia device 102 less frequently, and thus the battery life of remote control 112 will be extended.

In an embodiment, the time periods for polling multimedia device 102 may be determined based on usage probability of multimedia device 102. The usage probability is a probability of whether multimedia device 102 is in an active mode or in an idle mode at a particular time. The usage probability of multimedia device 102 may be determined from a combination that may include, for example, usage data and predictive machine learning algorithm, such as a Bayesian network. Once the usage probability for multimedia device 102 is determined, the usage probability may be correlated to a time period between polls via a function, including but not limited to a step or a Gaussian function.

The details for determining a time period between polls are described below.

Figure 2A:
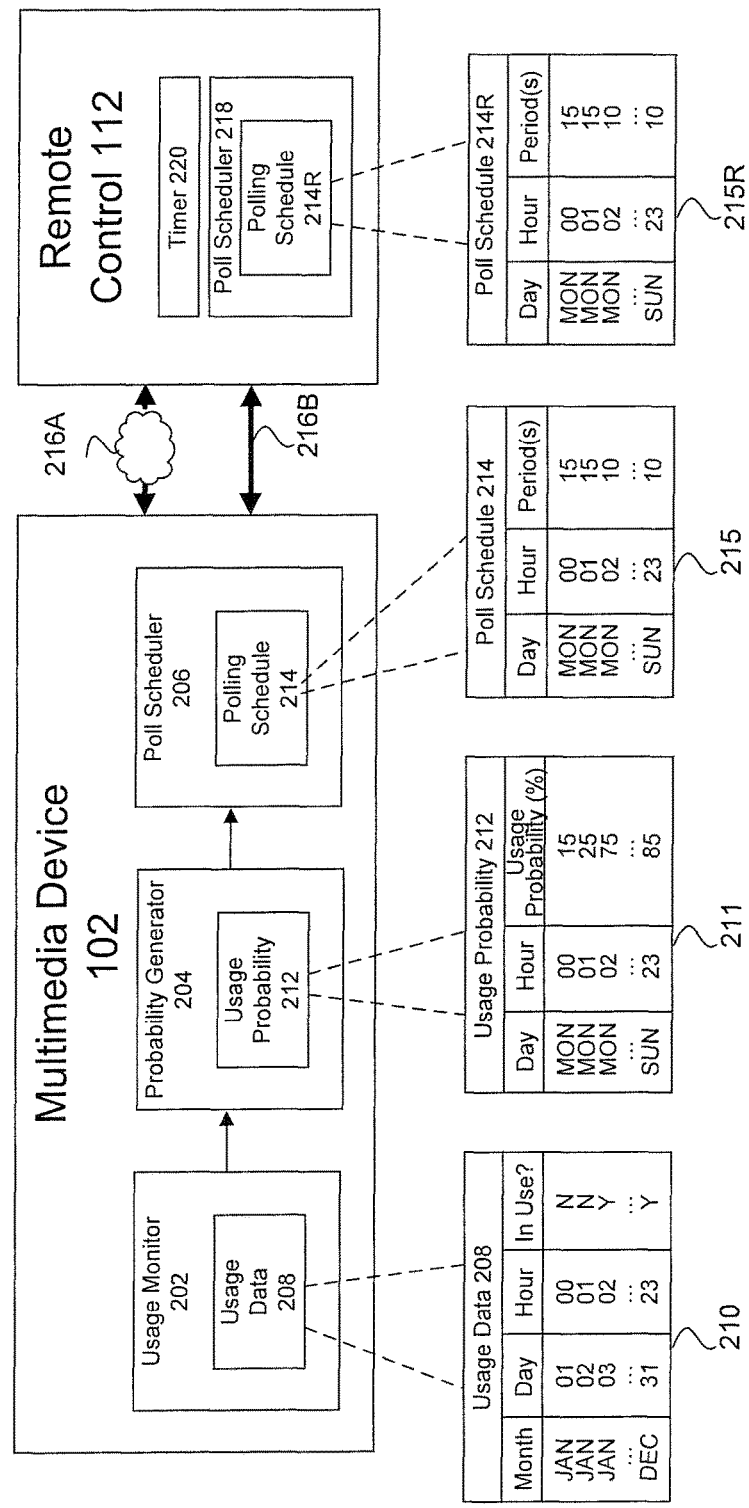
FIGS. 2A-C are block diagrams of systems including a remote control and a multimedia device, according to an embodiment.

FIG. 2A is a block diagram 200A of a remote control device and a multimedia device, according to an embodiment. Although the embodiments below are described with respect to multimedia device 102, the embodiments can also be applied to any device that communicates with remote control 112 or any device that performs the functions and simulates functionality of remote control 112.

In an embodiment, multimedia device 102 includes a usage monitor 202, a probability generator 204, and a poll scheduler 206.

Usage monitor 202 records usage data 208. Usage data 208 reflects when multimedia device 102 was in an active mode or an idle mode. Whether multimedia device 102 is in the active mode may be based on one or more criteria. Examples of when multimedia device 102 may be in an active mode include when multimedia device 102 requests content, selects a channel, streams content, etc. In another example, multimedia device 102 may be in an active mode when multimedia device 102 selects a movie, but not when the movie is streaming. In another example, multimedia device 102 may be in an active mode when multimedia device 102 plays a movie clip or a short movie, or data content in general that plays for less than a predetermined amount time. In another example, multimedia device 102 may be considered to be in an active mode when multimedia device 102 streams a particular type of streaming content. In another example, multimedia device 102 may be in an active mode when multimedia device 102 is on.

In a non-limiting embodiment, usage data 208 includes data that indicates when multimedia device 102 was in an active mode or an idle mode. Example data includes a "month," "day," "hour" and "in-use" flag as shown in exemplary table 210. The "month," "day," and "hour" categories indicate the time and the "in-use" flag indicates whether multimedia device 102 was in an active or idle mode during the indicated time. In an embodiment, the "in-use" flag may be a Boolean number that has a "true" or "false" state, or an integer that may be set to "zero" or "one," where "one" being an indication for multimedia device 102 being in an active mode and "zero" being an indication for multimedia device 102 being in an idle mode, or vice versa. In a further embodiment, as shown in FIG. 2A, the "in-use" flag may be set to an alphabetic letter "Y" or "N", where "Y" indicates an active mode and "N" indicates an idle mode, or vice versa. For example, usage data 208 in table 210 indicates that on January 2, at 2:00 am and on December 31, at 11:00 pm multimedia device 102 was in an active mode, while on January 1 at midnight, and January 2, at 1:00 am, multimedia device 102 was in an idle mode.

In an embodiment, probability generator 204 determines the probability of whether multimedia device 102 will be in an active or idle mode at a particular future time, also referred to as usage probability 212. For example, probability generator 204 receives usage data 208 from usage monitor 202, and generates a usage probability 212 from usage data 208. In an embodiment, probability generator 204 generates usage probability 212 using a predictive learning machine algorithm. An example predictive learning machine algorithm may include a Bayesian network that correlates the day and/or time in the past to whether multimedia device 102 was in an active mode or in an idle mode. A person skilled in the art will appreciate that a Bayesian network represents a set of random variables and their conditional dependencies via a directed acyclic graph, such as a diagram in FIG. 3, below.

In an embodiment, probability generator 204 receives usage data 208 that includes a "month," "day," "hour," and "in-use" data for multimedia device 102. Probability generator 204 then generates usage probability 212 that multimedia device 102 will be "in-use" for a given "day" and "hour." An example usage probability 212 is shown in table 211. As shown in exemplary table 211, the usage probability of multimedia device being used on Monday at on or about 1:00 a.m. is 25%, while on Sunday at on or about 11:00 pm is 85%.

In an embodiment, to generate usage probability 212, probability generator 204 determines a sum of times that multimedia device 102 was in use at a particular time over a predetermined number of days and divides the sum by the total number of times that multimedia device 102 was polled at the particular time over the predetermined number of days. The result may be a probability that multimedia device 102 will be in use at a particular time.

In an embodiment, poll scheduler 206 receives usage probability 212 for each "day" and "hour" and uses usage probability 212 to determine a polling schedule 214. Polling schedule 214 includes a time period for each time frame that includes a "day" and "hour." An example polling schedule 214 is shown in table 215 where on Monday at midnight the time period between polls is 15 seconds, while on Monday at 2:00 am the time period between polls is 10 seconds.

In an embodiment, poll scheduler 206 determines a time period between polls for each "day" and "hour" using a step function or a Gaussian function. In a step function, if multimedia device 102 has a probability of being in an active mode more than a predefined percentage, than the period between polls may be set to a first value, and if a probability that multimedia device 102 is in an active mode is less than the predefined percentage, the time period between polls is set to a second value. In an embodiment, the first value may be greater than the second value.

In a Gaussian function, the polling period may be set to different times, based on the probability. For example, if the polling period is defined using Gaussian function y(x), where y(1.00)=10 and y(0.00)=15 (where 1.00 indicates 100% usage probability and 0.00 indicates 0% usage probability), then the polling period for probabilities between 0.00 and 1.00 would be between 10 and 15 seconds.

In another embodiment, poll scheduler 206 may determine a time period between polls using a bimodal or a multimodal distribution of the probability values. Bimodal and multimodal distributions may be multiple Gaussian functions combined together. For example, in a bimodal or multimodal function, poll scheduler 206 sets a polling period around particular polling probabilities. For example, if probability that multimedia device 102 is in the active mode is 25%, time period between polls may be 15 seconds, but when probability that multimedia device 102 is in the active mode is 75%, the time period between polls may be 10 seconds.

In a further embodiment, a time period between polls may be measured in seconds, minutes, hours or any other unit of time.

In an embodiment, once poll scheduler 206 determines the time period between polls for each "day" and "hour," multimedia device 102 transmits polling schedule 214 to remote control 112 via networks 216A and/or 216B.

In a further embodiment, probability generator 212 and poll scheduler 206 may recalculate polling schedule 214 as usage data 208 changes or at predefined time intervals. The multimedia device 102 then transmits the recalculated polling schedule 214 to remote control 112.

In an embodiment, network 216A may be a local wireless network, such as a Wi-Fi network, Bluetooth®, or a local area network that connects multimedia device 102 to remote control 112. In a further embodiment, multimedia device 102 may be connected to remote control 112 using a wired network or cable, collectively referred to as network 216B. An example network 216B may be implemented using a Universal Serial Bus ("USB") cable or another cable. In a further embodiment, multimedia device 102 may transmit polling schedule 214 to portable computing device 114 using network 106 where portable computing device 114 simulates remote control 112.

In an embodiment, remote control 112 includes a poll scheduler 218 and a timer 220. When remote control 112 receives polling schedule 214, remote control 112 stores polling schedule 214 as polling schedule 214R in memory storage included in remote control 112. An example polling schedule 214R may be represented in table 215R.

Remote control 112 then polls multimedia device 102 according to polling schedule 214R. For example, poll scheduler 218 accesses polling schedule 214R, and based on the "day" and "time" in polling schedule 214R sets timer 220 to a time period that corresponds to the "day" and "time" in polling schedule 214R. For example, on Monday at midnight, polling scheduler 218 sets timer 220 for 15 seconds. Once timer 220 is set, or a configurable period of time thereafter, remote control 112 enters a sleep mode for the set time period and conserves the battery of remote control 112. Once the time period set by timer 220 expires, remote control 112 enters an active mode and polls multimedia device 102. Polling scheduler 218 then sets timer 220 for another time period as specified in polling schedule 214R. This way, remote control 112 stays in a sleep mode for a longer period of time when historically multimedia device 102 is in the idle mode, and for a shorter period of time when historically multimedia device 102 is in the active mode.

Figure 2B:
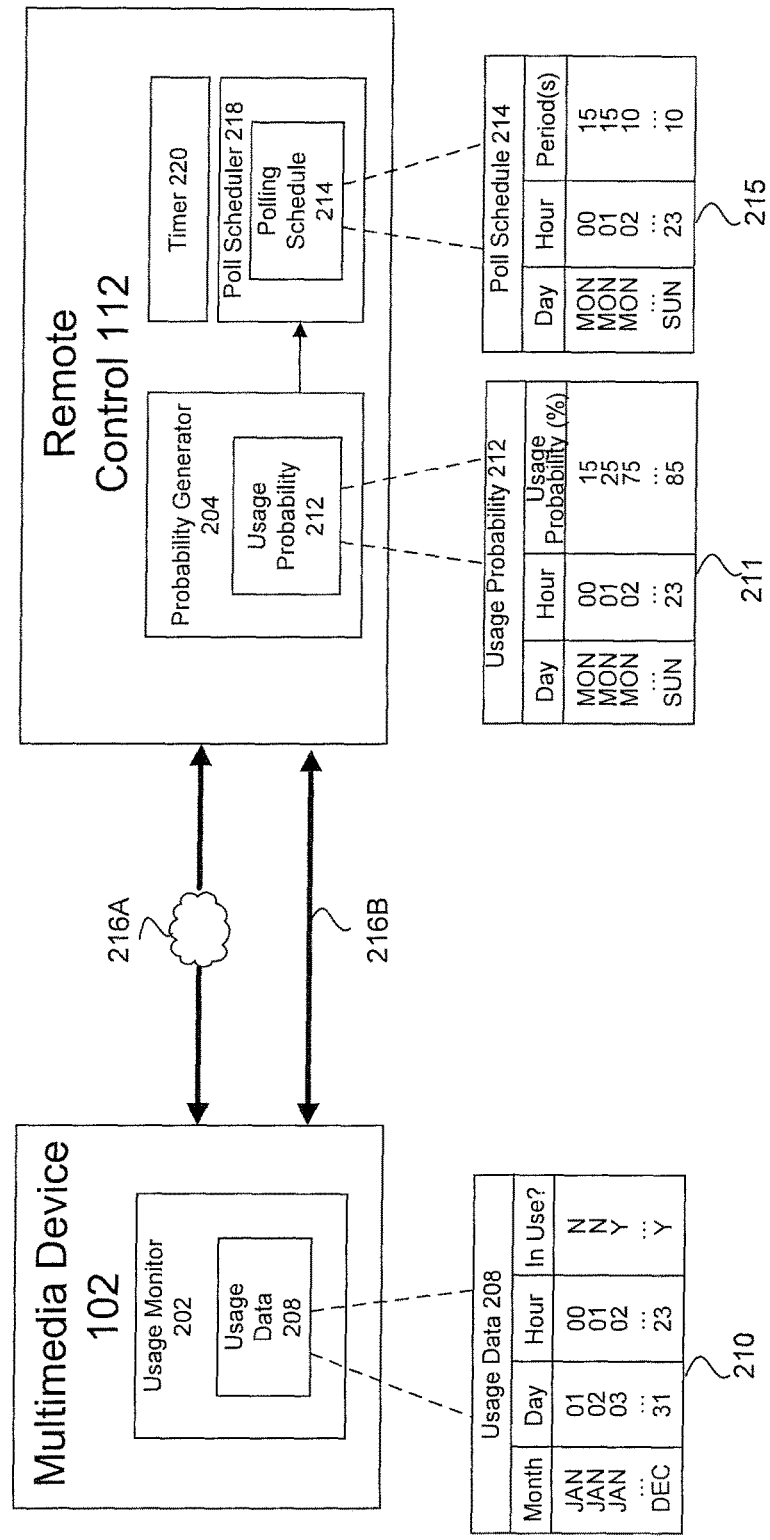

FIG. 2B is a block diagram 200B of a remote control and a multimedia device, according to an embodiment. In block diagram 200B, usage monitor 202 may transmit usage data 208 to remote control 112 where probability generator 204, and/or poll scheduler 206 determine polling schedule 214. In a further embodiment, remote control 112 may calculate polling schedule 214 when remote control 112 recharges its battery, when the charge is above a predefined threshold, or at preconfigured time intervals.

Figure 2C:
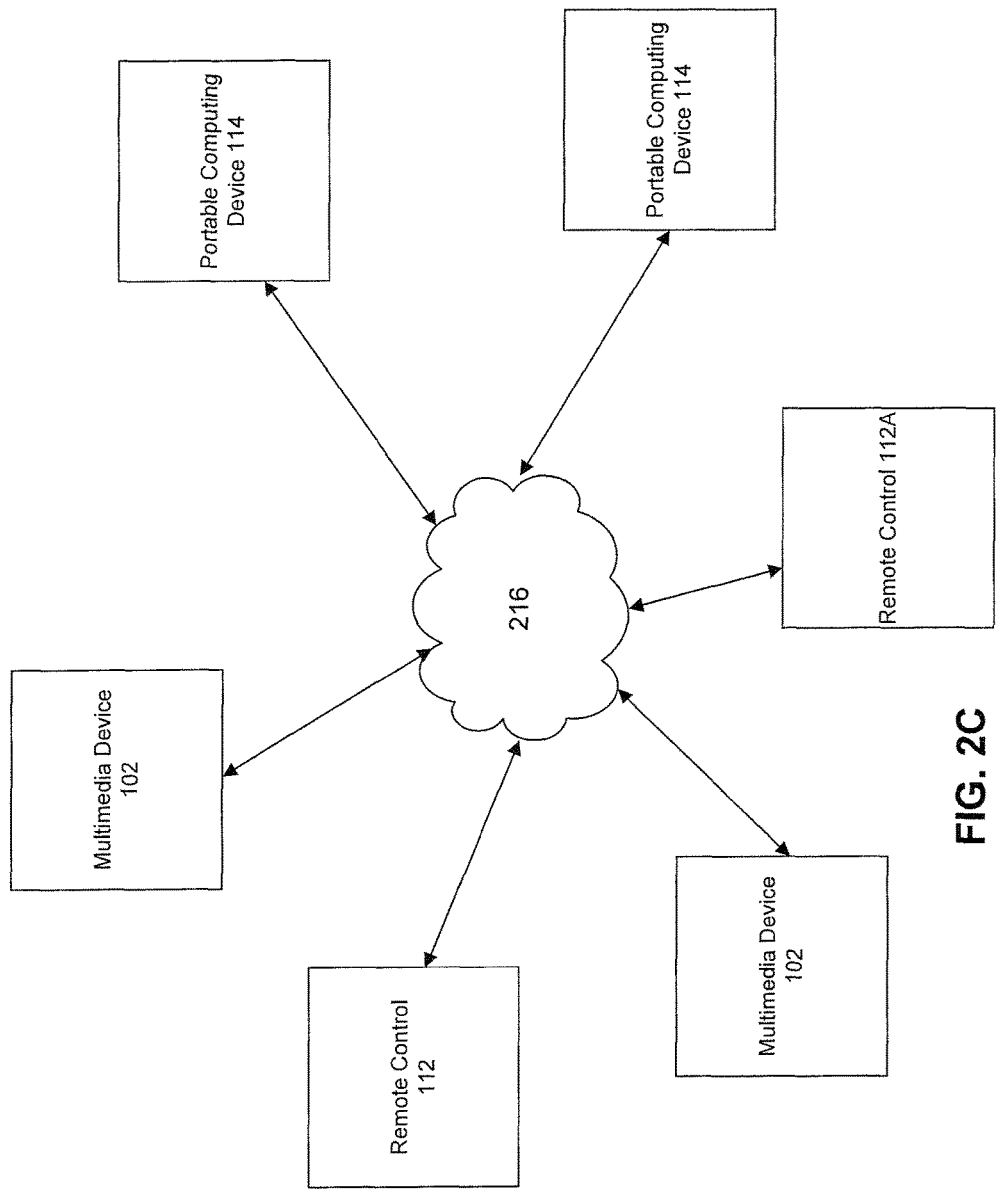

FIG. 2C is a block diagram 200C of remote controls and a multimedia device, according to an embodiment. In block diagram 200C, several remote controls 112 and/or portable computing devices 114 that simulate remote controls 112 are communicatively connected over network 216A or 216B (collectively referred to as network 216 in FIG. 2C) and include one or more probability generators 204 and poll schedulers 206 (not shown.) Probability generators 204 and poll schedulers 206 can calculate polling schedule 214 individually or collectively and in parallel from usage data 208 that is generated by multimedia device 102. For example, each remote control 112 may receive a portion of usage data 208 from one or more multimedia devices 102. Remote controls 112 may then use probability generator 204 and poll scheduler 206 to determine polling schedules associated with each remote control 112 and then combine the individual polling schedules into polling schedule 214. For example, the individual polling schedules may be transferred via network 216 to a single remote control 112A, where remote control 112A combines the individual polling schedules into polling schedule 214.

In a further embodiment, remote controls 112 that are connected to a power source and are recharging may receive usage data 208 such that remote controls 112 generate the respective polling schedules while being plugged into a power source to thereby further conserve the battery life. In another embodiment, remote controls 112 may calculate polling schedule 214 when the charge is above a predefined threshold, or at preconfigured time intervals.

In another embodiment, multiple multimedia devices 102 may communicate with each other and generate a polling schedule from usage data associated with multiple multimedia devices 102. The polling schedule may then be distributed to remote controls 112 and portable computing devices 114 via network 216 (which may be a combination of networks 106A and/or 106B), where remote controls 112 and portable computing devices 114 poll multimedia devices 102 according to the polling schedule associated with multiple multimedia devices 102.

Figure 3:
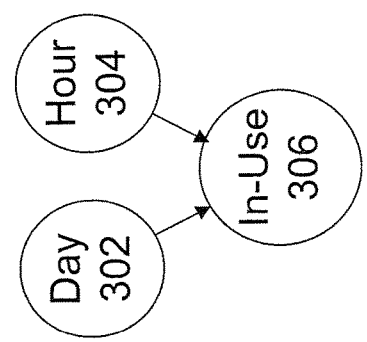
FIG. 3 is a diagram of a Bayesian network that correlates usage of a multimedia device to time, according to an embodiment.

FIG. 3 is a diagram 300 of a Bayesian network that correlates usage of a multimedia device to time, according to an embodiment. As shown in diagram 300, the Bayesian network may be one of several machine learning methodologies that determine usage probability 212 from usage data 208. For example, Bayesian network determines usage probability 212 of multimedia device 102 by correlating when multimedia device 102 was in-use 306 (in active or idle mode) to day 302 and hour 304, and repeating the correlation over weeks or months. As discussed above, usage probability 212 may be constructed based on the historical usage of multimedia device 102 described in usage data 208.

Figure 4:
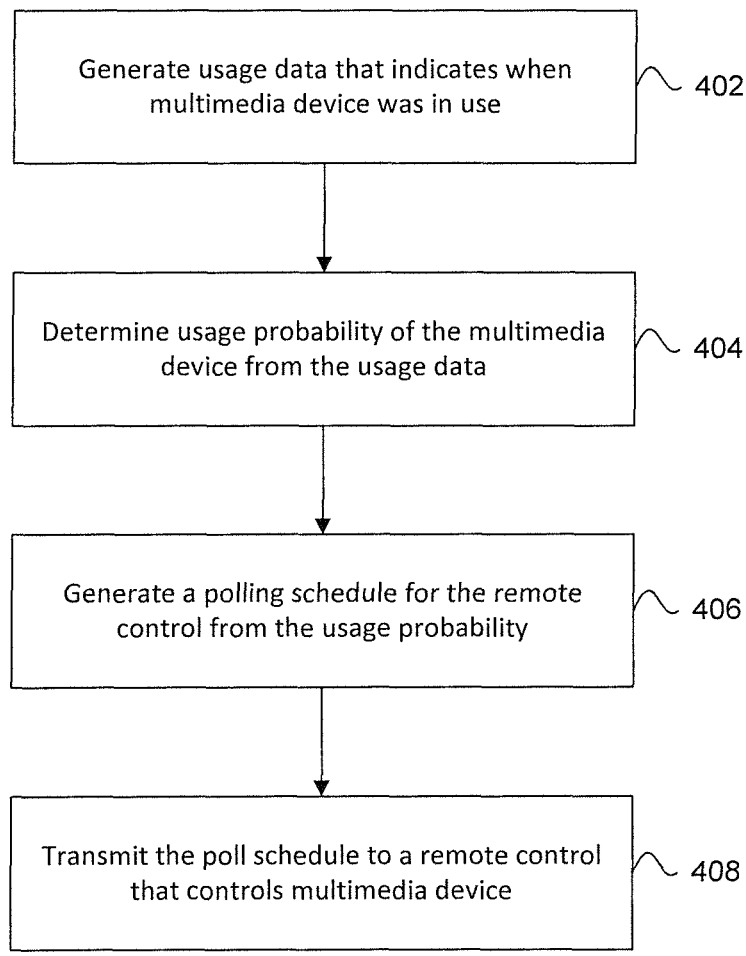
FIG. 4 is a flowchart of a method for determining a polling schedule, according to an embodiment.

FIG. 4 is a flowchart of a method 400 for determining a polling schedule, according to an embodiment.

At operation 402, a multimedia device records usage data. For example, usage monitor 202 records usage data 208 based on the usage of multimedia device 102. As discussed above, usage data 208 identifies when multimedia device 102 is in an active or idle mode, as specified according to a predefined criteria. Example criteria may include streaming content 110 which will likely involve the use of remote control 112, such as, multimedia content that is shorter than a predefined length or content of a particular type. When multimedia device 102 processes multimedia content that matches the criteria, usage monitor 202 records that multimedia device 102 is in an active mode or in an idle mode.

At operation 404, the multimedia device determines usage probability. For example, probability generator 204 uses usage data 208 to generate usage probability 212. Usage probability 212 is probability that multimedia device 102 is in an active or idle mode at a particular point in time. In an embodiment, probability generator 204 uses machine learning algorithms, such as Bayesian network to generate usage probability 212. As discussed above, in an embodiment, probability generator 204 may add a number of times that multimedia device 102 was polled when multimedia device 102 was in an active mode over a particular time period, and divide the sum by a number of times multimedia device 102 has been polled during the particular time period.

At operation 406, the multimedia device generates a polling schedule. For example, poll scheduler 206 generates a polling schedule 214 that includes polling time period for different times of day. Polling schedule 214 predicts whether remote control 112 will be active or idle during different times of day. In one embodiment, poll scheduler 206 correlates a particular usage probability 212 to a particular time period. In an embodiment, poll scheduler 206 may correlate usage probability 212 using a Gaussian function.

At operation 408, the multimedia device transmits a polling schedule to a remote control. For example, multimedia device 102 transmits polling schedule 214 to remote control 112, such that remote control 112 uses polling schedule 214R to poll multimedia device 102 according to time periods in polling schedule 214R.

Figure 5:
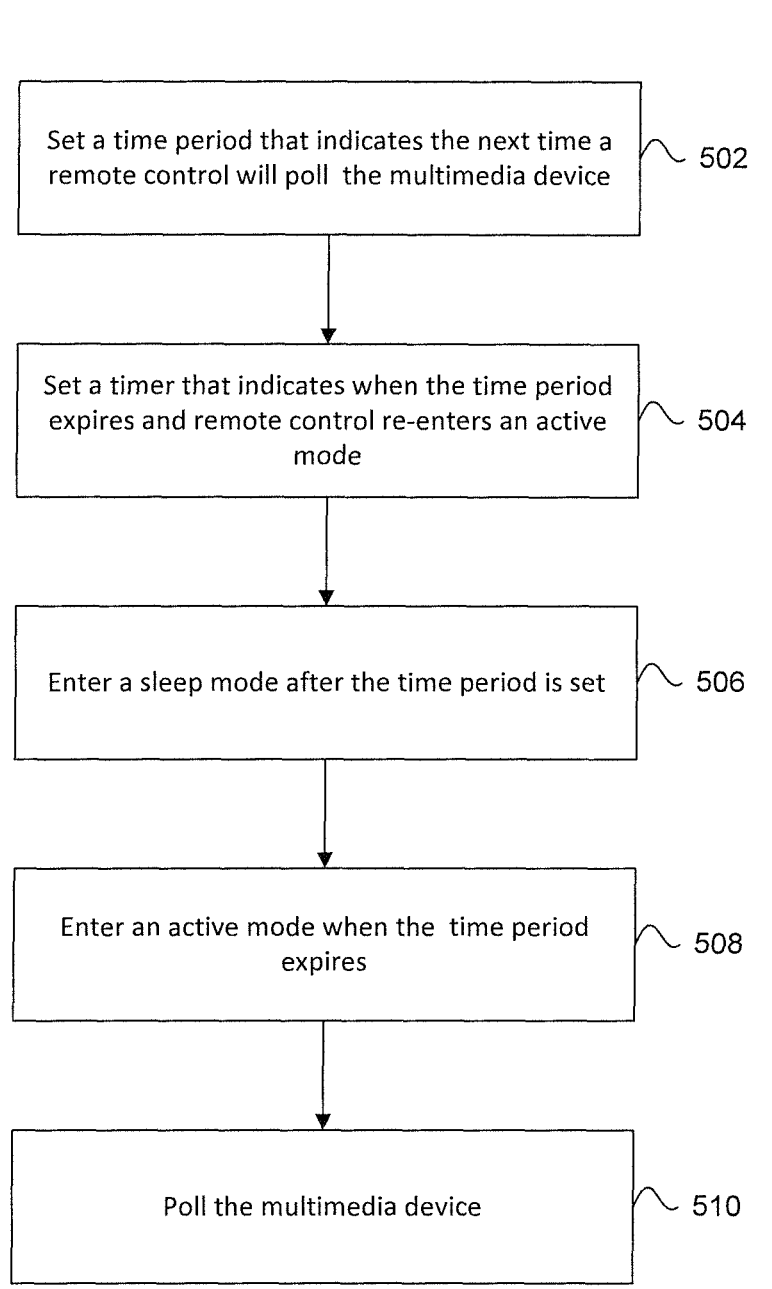
FIG. 5 is a flowchart of a method for polling a multimedia device, according to an embodiment.

FIG. 5 is a flowchart of a method 500 for polling a multimedia device by a remote control, according to an embodiment.

At operation 502, the remote control sets a period for polling the multimedia device. For example, poll scheduler 218 executing on remote control 112 determines a time period from polling schedule 214R that indicates the time interval for polling multimedia device 102.

At operation 504, the remote control sets a timer. For example, poll scheduler 218 sets timer 220 that activates remote control 112 from the sleep mode at the end of the period.

At operation 506, the remote control enters a sleep mode. For example, after poll scheduler 218 sets timer 220, remote control 112 enters a sleep mode that conserves the battery.

At operation 508, the remote control enters an awake mode. For example, remote control 112 enters an awake period when timer 220 goes off when the time period expires.

At operation 510, a multimedia device is polled. For example, remote control 112 polls multimedia device 102 once remote control 112 enters the awake mode. After operation 510, the flowchart proceeds to operation 502, where poll scheduler 218 sets another time period as indicated in polling scheduler 214R. As discussed, during the time period remote control 112 enters a sleep mode.

Various embodiments can be implemented, for example, using one or more well-known computer systems or one or more components included in computer system 600 shown in FIG. 6. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 630, such as monitors, keyboards, pointing devices, etc, that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/or any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

Computer system 600 may further include a power source 632. Power source 632 supplies energy to computer system 600 that allows components within computer system 600 to function. Power source 632 may be a stand alone device or be incorporated into computer system 600. In a further embodiment, power source 632 converts mains alternating-current ("AC") into a low voltage direct current ("DC") that is compatible with computer system 600.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method, comprising:
    collecting, by a multimedia device, usage data, wherein the usage data identifies when the multimedia device is in-use during different times of day;
    determining usage probability of the multimedia device based on the usage data, wherein the usage probability includes probability values that correspond to the different times of day;
    generating a polling schedule for a remote control device based on the usage probability, wherein the polling schedule includes different polling periods associated with the different times of day, each of the different polling periods indicate a time period between polls for the remote control device, and the different polling periods are inversely correlated to the probability values of the determined usage probability; and
    transmitting, by the multimedia device, the polling schedule to the remote control device, whereby the polling schedule causes the remote control device to conserve battery life of the remote control device by polling the multimedia device according to the different polling periods included in the polling schedule.

2. The method of claim 1, wherein the usage data corresponds to times the multimedia device is active and idle.

3. The method of claim 2, wherein the multimedia device is active when the multimedia device receives multimedia content.

4. The method of claim 2, wherein the multimedia device is active when the multimedia device processes multimedia content of a particular type and length.

5. The method of claim 1, wherein determining the usage probability further comprises using a machine learning algorithm that correlates day and time to use of the multimedia device.

6. The method of claim 1, wherein generating the polling schedule further comprises using at least one of a Gaussian function or a Bayesian network that correlates the time period between polls to a probability value.

7. The method of claim 1, wherein the usage probability is generated based on times the multimedia device was in-use at a particular time over a predetermined number of days and times the multimedia device received a polling signal at the particular time over the predetermined number of days.

8. The method of claim 1, further comprising:
    for each of the different times of day indicated in the polling schedule, receiving, at the multimedia device, at least one polling signal from the remote control device.

9. The method of claim 1, wherein
    the remote control device is a remote control that manipulates the multimedia device, and the remote control device enters a low power mode during the time period between polls and enters a higher power mode at the end of the time period between polls.

10. A system, comprising:
a multimedia device including a memory and a processor, and configured to:
collect, using the processor, usage data, wherein the usage data identifies when the multimedia device is in use during different times of day and wherein the usage data is stored in the memory;
determine usage probability of the multimedia device based on the usage data, wherein the usage probability includes probability values that correspond to the different times of day;
generate a polling schedule for a remote control device based on the usage probability, wherein the polling schedule includes different polling periods associated with the different times of day, each of the different polling periods indicate a time period between polls for the remote control device, and the different polling periods are inversely correlated to the probability values of the determined usage probability; and
transmit the polling schedule to the remote control device, whereby the polling schedule causes the remote control device to conserve battery life of the remote control device by polling the multimedia device according to the different polling periods included in the polling schedule.

11. The system of claim 10, wherein the usage data corresponds to times the multimedia device is active and idle.

12. The system of claim 11, wherein the multimedia device is active when the multimedia device receives multimedia content.

13. The system of claim 12, wherein the multimedia device is active when the multimedia device processes multimedia content of a particular type and length.

14. The system of claim 10, wherein to determine the usage probability, the processor is further configured to use a machine learning algorithm that correlates day and time to use of the multimedia device.

15. The system of claim 14, wherein to generate the polling schedule, the processor is further configured to use at least one of a Gaussian function or a Bayesian network that correlates the time period between polls to a probability value.

16. The system of claim 10, wherein the remote control device includes a timer that is set to different time periods that correspond to the different times of day indicated in the polling schedule and the remote control device remains in the low power mode until the timer expires in the different time periods.

17. The system of claim 10, wherein the processor is further configured to:
for each of the different times of daytime indicated in the polling schedule, receive, at the multimedia device, at least one polling signal from the remote control device.

18. The system of claim 10, wherein
the remote control device is a remote control that manipulates the multimedia device, and
the remote control device enters a low power mode during the time period between polls, and enters a higher power mode at the end of the time period between polls.

19. A non-transitory computer readable medium having instructions stored thereon, that, when executed on a computing device cause the computing device to perform operations, the operations comprising:
collecting, by a multimedia device, usage data, wherein the usage data identifies when the multimedia device is in-use during different times of day;
determining usage probability of the multimedia device based on the usage data, wherein the usage probability includes probability values that correspond to the different times of day;
generating a polling schedule for a remote control device based on the usage probability, wherein the polling schedule includes different polling periods associated with the different times of day, each of the different polling periods indicate a time period between polls for the remote control device, and the different polling periods are inversely correlated to the probability values of the determined usage probability; and
transmitting, by the multimedia device, the polling schedule to the remote control device, whereby the polling schedule causes the remote control device to conserve battery life of the remote control device by polling the multimedia device according to the different polling periods included in the polling schedule.

20. The non-transitory computer readable medium of claim 19, the operations further comprising:
for each of the different times of day indicated in the polling schedule, receiving, at the multimedia device, at least one polling signal from the remote control device.

* * * * *